United States Patent [19]
Niedecker

[11] Patent Number: 4,832,326
[45] Date of Patent: May 23, 1989

[54] METHOD FOR THE PRECISE GEOMETRICAL POSITIONING OF WORK PIECES

[76] Inventor: Herbert Niedecker, c/o H. Niedecker GmbH; Westerbacherstr. 45, 6000 Frankfurt/Roedelheim, Fed. Rep. of Germany

[21] Appl. No.: 556,453

[22] Filed: Nov. 30, 1983

Related U.S. Application Data

[63] Continuation-in-part of Ser. No. 198,882, Oct. 20, 1980, Pat. No. 4,429,862, which is a continuation of Ser. No. 2,928, Jan. 12, 1979, abandoned.

[30] Foreign Application Priority Data

Jan. 23, 1978 [DE] Fed. Rep. of Germany ....... 2802791

[51] Int. Cl.$^4$ .............................................. B23Q 1/00
[52] U.S. Cl. ................................................... 269/329
[58] Field of Search ................... 269/91, 99, 258, 239, 269/296, 50, 309-315, 75, 47, 49-52, 164, 900, 249, 303, 321; 248/663, 678

[56] References Cited

U.S. PATENT DOCUMENTS

| | | |
|---|---|---|
| 1,063,332 | 6/1913 | Diehl . |
| 1,380,347 | 6/1921 | Blume . |
| 1,497,107 | 6/1924 | Lasell . |
| 1,676,290 | 7/1928 | Schron . |
| 1,788,652 | 1/1931 | Andrew et al. . |
| 1,807,795 | 6/1931 | Pope . |
| 1,954,708 | 4/1934 | Mass .................................. 269/900 |
| 2,325,387 | 7/1943 | Fredrickson . |
| 2,547,211 | 4/1951 | Holmes . |
| 2,593,538 | 4/1952 | Cleveland . |
| 2,619,010 | 11/1952 | Mathison . |
| 2,828,589 | 4/1958 | Hercik . |
| 3,181,858 | 5/1965 | Daniels . |
| 3,353,771 | 11/1967 | Bow .................................... 248/663 |
| 3,537,697 | 11/1970 | Davis .................................. 269/50 |
| 3,606,300 | 9/1971 | Davis . |
| 3,704,880 | 12/1972 | Gudel ................................. 269/315 |
| 3,978,574 | 9/1976 | Stith .................................... 249/678 |
| 4,157,819 | 6/1979 | Meyer ................................. 269/900 |

FOREIGN PATENT DOCUMENTS

| | | |
|---|---|---|
| 3244 | 1/1974 | European Pat. Off. . |
| 1158910 | 5/1961 | Fed. Rep. of Germany . |
| 1903576 | 7/1964 | Fed. Rep. of Germany . |
| 121295 | 2/1955 | German Democratic Rep. . |
| 583756 | 11/1944 | United Kingdom . |
| 820224 | 11/1956 | United Kingdom . |
| 910717 | 3/1961 | United Kingdom . |
| 1135922 | 1/1968 | United Kingdom . |

OTHER PUBLICATIONS

"Werkstueckspanner (Vorrichtungen)" K. Schreyer, Springer Verlag, Berlin, Heidelberg, NY 1969.
"Berechnung und Konstruktion von Vorrichtungen" by 5. Auflage, Veb, Verlag Technik (by Erich Ziegener).

Primary Examiner—Robert C. Watson
Attorney, Agent, or Firm—W. G. 32Fasse; D. H. Kane, Jr.

[57] ABSTRACT

A work piece of irregular or random outer contours is geometrically determined in its position in a given three-dimensional coordinate system before any supporting and clamping of the work piece. This determination of a precise geometrical work piece position is accomplished with the aid of three and only three flat plane work piece seating surfaces forming part of three spheres having a segment cut off to form the respective flat plane seating surface. The three spheres are held in three spherical sockets which define three pivot points for the respective sphere. The pivot points are fixed in the three-dimensional coordinate system and hence define a first reference plane relative to which the geometrical work piece position is determined. Any subsequent supporting and/or clamping of the position determined work piece does not disturb the position determination.

7 Claims, 9 Drawing Sheets

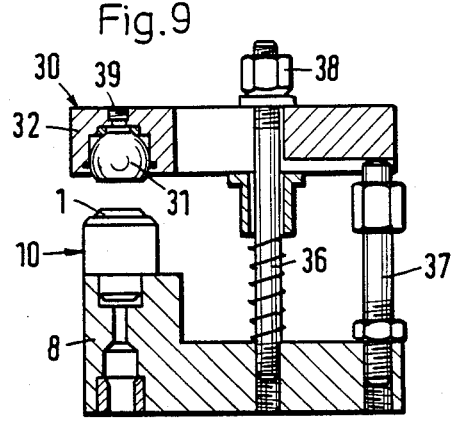
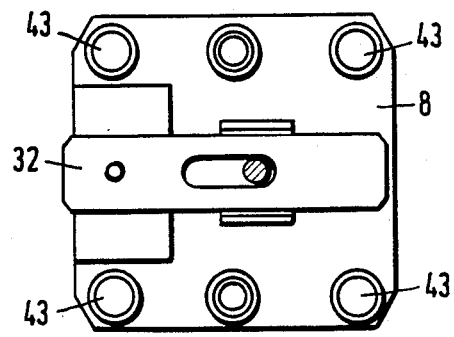
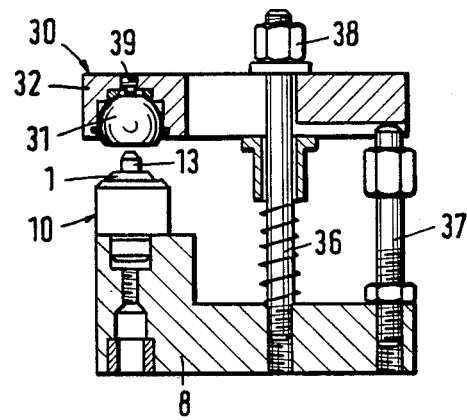

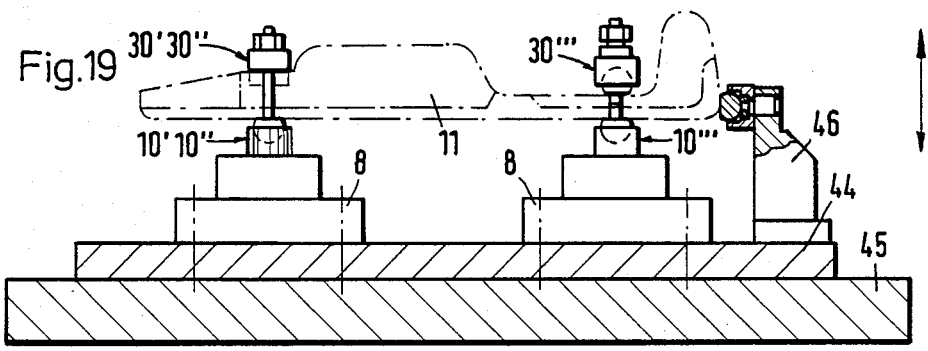
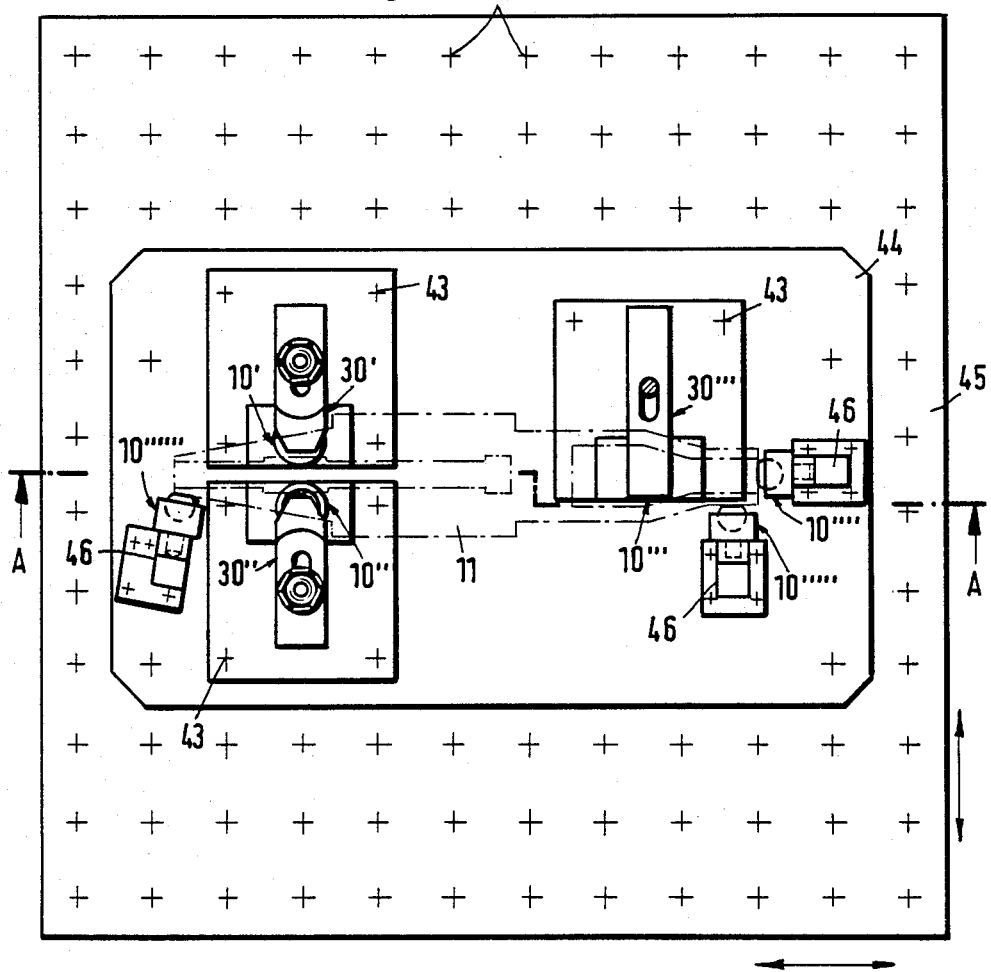

METHOD FOR THE PRECISE GEOMETRICAL POSITIONING OF WORK PIECES

CROSS-REFERENCE TO RELATED APPLICATION

This application is a continuation-in-part application of my copending application Ser. No.: 198,882, filed in the U.S. on Oct. 20, 1980, now U.S. Pat. No. 4,429,862 which in turn is a continuation of 002,928, filed in the U.S. on Jan. 12, 1979 now abandoned.

BACKGROUND OF THE INVENTION

This invention relates to a method and device for the precise geometrical positioning of work pieces having irregular or random surface configurations which are to be machined.

When blanks are to be machined by a machine tool in the manufacture of finished work pieces, such as parts for machines or for aircraft, the blanks must be correctly and precisely positioned in space relative to a three-dimensional coordinate system as determined by the machine tool so that the parts are properly accessible to the machining tools. The work piece may be positioned with respect to one, two or three planes in a three-dimensional coordinate system having the space coordinates X, Y, Z.

According to the invention the work piece is positioned by three positioning devices before any clamping of the work piece. A clear distinction must be made between positioning, supporting and clamping of a work piece because otherwise it is not possible to properly understand this invention. The positioning of a work piece must take place first for defining its location in a fixed three-dimensional coordinate system or at least relative to one defined plane in such a fixed coordinate system. Precision machining cannot be performed without precision locating of the work piece. The supporting of the work piece in the machine tool must take place after the positioning. The supporting takes up the weight of the work piece and must not under any circumstances disturb the already established precise position of the work piece. Theoretically the supporting of the work piece may involve a suspending of the work piece so that the three positioning devices would not participate in bearing the weight of the work piece. The clamping of the work piece, which also takes place after the positioning must again not disturb the precise work piece position.

The positioning with respect to a first plane in a rectangular three-dimensional coordinate system must be highly accurate and has been very time-consuming heretofore especially when the blanks have uneven or random surfaces. This positioning with respect to the first plane often could not be effected with the required accuracy heretofore unless the surface of the blank to be engaged by the machine tool members has been machined prior to the positioning or seating. The invention avoids such preliminary machining.

During the clamping of the positioned blank, the presence of uneven surfaces of the blank often gave rise to an undesired straining of the blank so that the machining would result in a defective work piece because after release of the machined work piece the latter could flex back into a shape it had prior to its clamping thereby preventing a precision machining. Even when the engaged surfaces of the blank have been machined prior to a conventional clamping, it is not always ensured that the work piece will not be strained and elastically deformed as it is clamped. Previously these difficulties have been kept within tolerable limits in that the surfaces for engaging the work piece for the positioning with respect to the first plane were made as accurate as necessary by a preliminary machining operation although this required a high additional labor expenditure. Thus, avoiding a preliminary machining operation would constitute a substantial advance in the art.

From U.S. Pat. No. 2,325,387 (Fredrickson) it is known that work pieces to be machined can be clamped by a clamping bar which carries two spherical elements, each of which has a base for engaging the work piece whereas each spherical surface is fitted in a seat formed in the clamping bar which itself is pivotable for accommodating different work pieces which differ in height. In accordance with said references, the work piece is positioned and clamped in the usual manner simultaneously whereby the clamping can defeat the desired precision positioning of the work piece.

U.S. Pat. No. 1,788,652 (Andrew et al) shows a work piece clamping device in which machined surfaces are required for the clamping by two lateral clamps and by two end clamps. Each of the end clamps has a clamping member with a spherical surface portion held in a spherical recess for permitting slight variations in the position of the clamp relative to the work piece. Andrew et al does not make use of the fact that three and only three points, the coordinates of which are given, determine geometrically a plane in a coordinate system. Andrew et al's clamping member with the spherical surface does not directly contact the work piece, it merely permits slight adjustments of the clamping elements.

East German Pat. No. 121,295 (Dassler et al) supports and simultaneously clamps a work piece at three locations whereby each of the three locations is provided with three support cams, providing a total of nine support cams which defeats the effective utilization of three and only three position determining points. The work piece is supported at best, but not position determined in such a way that the clamping will be prevented from disturbing the work piece position.

OBJECTS OF THE INVENTION

It is an object of the invention to provide a device which serves for the precise positioning and subsequent clamping of work pieces and enables a work piece to be positioned and clamped without being strained in its elastic deformation range, and without any need for first machining clamping surfaces on a work piece so that work pieces with any random surface configuration may be precisely positioned.

It is another object to provide a method for positioning a work piece precisely at least with respect to one plane defined in a given three-dimensional coordinate system by making use of the fact that such a plane is defined in its position or location in space by three and only three points, the coordinates of which are given.

A still further object is to make sure that after the precise geometrical positioning of a work piece the position of the work piece will not be disturbed by the subsequent clamping and/or supporting of the work piece.

It is also an object to provide a work piece positioning method which achieves for all practical purposes the contacting of a random configuration work piece surface at three geometrically defined fixed points although the contacting itself involves three flat lane surfaces which are pivotable about the respective one of said three fixed points.

SUMMARY OF THE INVENTION

The above objects of the invention have been accomplished by providing a set of seating surfaces consisting exclusively of three flat plane position determining work piece seating surfaces directly contacting said random work piece surface configuration with said exclusively three flat plane seating surfaces each of which has a fixed relationship to said one, first reference plane of said three planes in said three-dimensional coordinate system, said providing step including establishing a separate universal fixed pivot point for each of said exclusively three flat plane work piece seating surfaces for defining said first reference plane, said step of establishing comprising holding three spheres, each having a cut-off portion forming said three flat plane seating surfaces, in three respective sockets each having a spherical surface bottom on which the respective sphere sits pivotally with a spherical surface opposite its flat plane seating surface, and holding the respective sphere in its socket along a circle substantially around the sphere's diameter, each universal fixed pivot point permitting pivoting of its respective flat plane seating surface independently of any of the other two flat plane seating surfaces of said set of exclusively three flat plane seating surfaces, said step of directly contacting all three flat plane seating surfaces including placing the work piece on each flat seating surface to such an extent that all three fixed pivot points are covered by the work piece reaching beyond all three fixed pivot points, and limiting the pivotal movement of each sphere independently of limiting the pivotal movement of the other two spheres by means extending centrally into said sphere and centrally through said spherical surface bottom of each socket, whereby said exclusively three flat plane seating surfaces determine the position of a work piece in said one, first reference plane defined by said three fixed pivot points.

A positioning device for performing the present method comprises a single sphere, a segment cut off said sphere to form a flat plane surface on said sphere, a first central bore extending at least partially through said sphere and having a first axis extending perpendicularly to said flat plane surface, socket means having a bottom formed centrally with a spherical indentation and a second central bore having a second axis and extending through said bottom and through said spherical indentation, said first and second central bores extending substantially in alignment with each other, said socket means pivotally holding said sphere on a spherical ring surface formed by said spherical indentation with said second central bore through said spherical indentation, said socket means further contacting said sphere substantially along a diameter circle extending in parallel to said flat plane surface when said single sphere is in a null position relative to said socket means wherein said first and second axes are in alignment with each other, so that said flat plane surface is extending out of said socket means for permitting a universal pivoting movement of said sphere carrier means forming an extension of said socket means, a third central bore extending in said carrier means substantially in alignment with said first and second central bores in the sphere and in the socket bottom, and means located at least partially through all bores for limiting the pivoting movement of said sphere around a fixed pivot point defined by said socket means. Said flat plane surface functions as a seating surface when three devices are used for the precise positioning of the work piece.

Desirably, the positioning members comprising flattened spherical elements are combined with clamping members also having spherical elements which are also mounted for a universal pivoting movement in spherical seats.

The positioning with respect to the second plane of a three-dimensional coordinate system may be effected by two stops. The positioning with respect to the third plane may be effected by an additional stop.

Further supports or stops may serve to support the work piece but do not serve to define the position of the work piece.

After the blank has been positioned on three seating surfaces, it is clamped by means of clamping members having clamping surfaces and must be held in position as it is machined. The clamping members have clamping surfaces and will be selected in dependence on the specific shape of the work piece and the intended machining.

It has been found that the previous need for a preliminary machining of positioning surfaces on a work piece can be eliminated by the use of the device according to the invention because the three spherical elements each having a flat plane seating surface compensate for the surface irregularities of the work piece which previously caused the work piece to be strained as it was clamped. The spherical elements provided on the clamping members also avoid a straining of the work piece. This results in a substantial saving of manufacturing costs because the work pieces need no longer be provided with positioning surfaces, which involved a high expenditure. The need for a subsequent machining of work pieces which had been improperly machined because they had been strained in the previous practice is also eliminated. Besides, the present devices are less expensive than prior art systems because they can be used in a modular system, particularly in combination with existing base plates or grid plates.

In a particularly desirable embodiment of the device according to the invention the positioning members and the clamping members are disposed opposite each other and preferably also in register with each other in pairs. This arrangement serves also to avoid a straining of the work piece.

In accordance with the invention, additional supporting and clamping members, particularly for the supporting with respect to the first plane, may be provided in addition to the positioning members and to the first mentioned clamping members. Said additional supporting members and additional clamping members may preferably be arranged opposite each other and also comprise flattened spherical elements with a plane surface and which are movably mounted in spherical seats for a universal pivoting movement and which have flat support and clamping surfaces for directly engaging the work piece. These additional supporting members and additional clamping members serve also to avoid a straining of the work piece, especially if they are arranged so that the members of a pair are aligned with each other.

According to a preferred further feature of the invention, the stops for positioning the work piece with respect to the second and third planes also comprise spherical elements each with a flat plane surface movably mounted in spherical seats for a universal pivoting movement. In this way the positioning members for defining the second and third planes also embody the contcept of using flattened spherical elements in order to avoid a straining of the work piece as it is clamped after it has been positioned. Alternatively, conventional stops may be used to position the work piece with respect to the second and third planes.

According to a further feature of the invention the positioning elements for defining the second and third planes may be incorporated in the positioning elements for defining the first plane. In that case each of the positioning members for defining the second and third planes comprises a locating pin, which is receivable by a bore of the work piece and is incorporated in a positioning member for defining the first plane. In that case too, the work piece can be clamped without being strained. This feature of the invention also results in a saving of costs because additional positioning members for defining the second and third planes are not required.

According to a further feature of the invention, each of the positioning members for defining the second and third planes comprises a screw with a shaft that is used to clamp the work piece and for this purpose extends through a bore in the positioning member for defining the first plane whereas the head of the screw serves to clamp the work piece and has a spherical undersurface, which fits a spherical seat member, which has a flat surface that engages the work piece.

In the just mentioned embodiment of the device according to the invention, the positioning members for defining the second and third planes constitute also clamping members for clamping the work piece.

Finally, the head of the screw may be received in a recess of the work piece. If the work piece has surfaces which permit such an arrangement of the clamping members, these surfaces can be machined without obstruction.

The positioning members according to the invention may be used in combination with conventional clamping members although such an arrangement will not always afford all advantages of the device according to the invention.

BRIEF FIGURE DESCRIPTION

In order that the invention may be clearly understood, it will now be described, by way of example, with reference to the accompanying drawings, wherein:

FIG. 9 shows a device according to the invention comprising a positioning member for defining the first plane and an oppositely disposed clamping member;

FIG. 10 is a top plan view showing the device of FIG. 9;

FIG. 11 shows a modification of the device of FIGS. 9 and 10, in which the positioning member for defining the first plane is provided with a positioning element for defining the second and third planes;

FIG. 19 is a sectional view taken on line A—A of FIG. 20; and

FIG. 20 is a top plan view, and shows positioning members functioning as additional stops.

Figure 1:
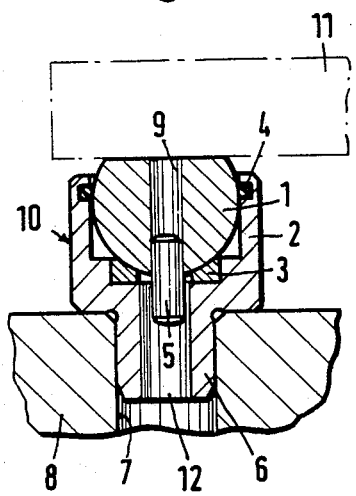
FIG. 1 shows a positioning member for defining the first, second and third planes.

DETAILED DESCRIPTION OF PREFERRED EXAMPLE EMBODIMENTS AND OF THE BEST MODE OF THE INVENTION

In the following detailed description of the drawings, identical or similar parts are designated with the same reference characters in the several figures.

FIG. 1 shows a positioning member 10 of the device according to the invention. The member 10 comprises a flattened sphere or spherical ball element 1, which has a segment cut off to form a flat plane work piece seating surface for engaging a work piece 11. The spherical element 1 is mounted in a housing 2 and can be universally pivoted within certain angular limits. The spherical element 1 is pivotally mounted in a spherical seat or ball socket 3 provided in the housing 2, whereby the sphere is held substantially along its circumference or diameter circle extending in parallel to the flat plane surface of the ball element 1 when the ball is in a null position so that the central axis of the device and a normal through the center of the flat plane seating surface coincide. The housing 2 of the positioning member 10 has an extension 6 forming a carrier means, which is fitted in a bore 7 of a baseplate 8 of the device according to the invention. In order to prevent an excessive pivotal movement of the spherical element 1 in the housing 2, a pin 5 is provided, which is force-fitted in a bore 9 of the spherical element 1 and protrudes into a larger bore 12 of the extension or carrier 6 so that the spherical element 1 is limited in its pivotal movement in the ball socket 3 of the housing 2. The sphere or ball element 1 with its ball socket 3 provides a universal pivot means.

In order to prevent dirt from entering between the spherical element 1 and the housing 2 and thus to ensure that the spherical element 1 can easily pivot, a seal 4, e.g. an O-ring, is provided at the top rim of the housing 2.

Because the spherical element or ball 1 is pivotally mounted in the housing 2, the flat plane surface of the spherical element 1 can be directly engaged with the work piece 11 as shown in all figures so that the latter can be exactly positioned by three positioning members 10 without a need for a preliminary machining of those surfaces of the work piece which are directly engaged by the flat surfaces of the spherical elements 1. The three pivot points of the three spheres are fixed in the three-dimensional coordinate system and thereby define the position of a work piece relative to a first plane in said coordinate system. Yet, these three fixed pivot points permit the pivoting of the flat plane seating surfaces which are thus enabled to compensate for irregularities in the random surface of the work piece.

The positioning members 10 shown in the figures described below are constructed as the positioning member 10 which has been described with reference to FIG. 1. In order to avoid repetition, only the differences between the subsequent figures and FIG. 1 will now be discussed.

Figure 2:
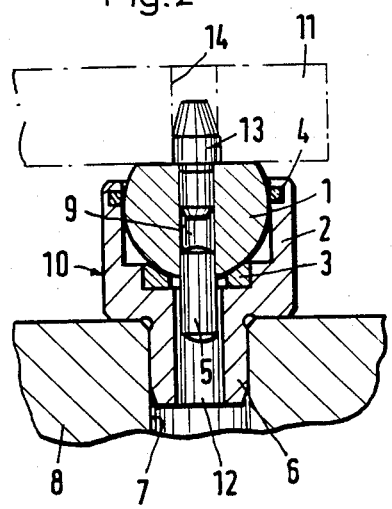
FIG. 2 shows the member of FIG. 1 constructed with a positioning member or element for defining the second and third planes.

In FIG. 2 the positioning member 10 of FIG. 1 is additionally provided with a locating pin 13, which is force-fitted in the bore 9, in which the pivotal movement limiting pin 5 is fitted. The locating pin 13 fits in a bore 14 of the work piece 11. To position the work piece with respect to the second and third planes, two of the three positioning members 10 which define the first plane may be provided with such locating pins 13.

Figure 3:
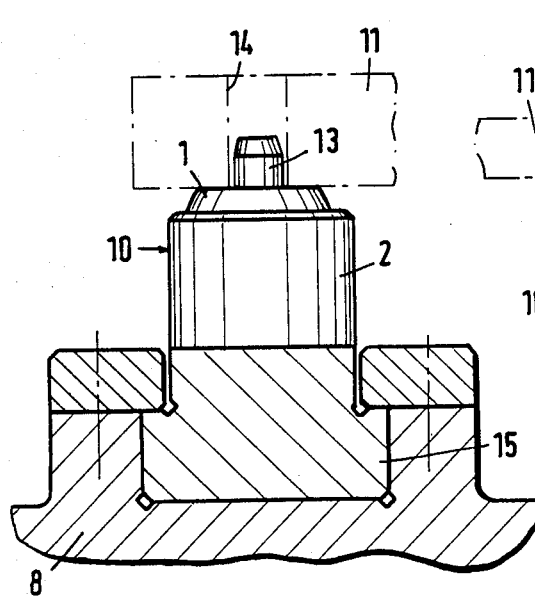
FIG. 3 shows a modification of the member of FIG. 2, in which the positioning member is mounted in a movable slide.

For a compensation of inaccuracies regarding the spacing of the locating bores 14 in the work piece 11, one of the two positioning members 1 shown in FIG. 3 and provided with a locating pin 13 is mounted on a longitudinal or transverse slide 15, which is mounted in the footplate 8, whereby the positioning member 10 is position adjustable.

Figure 4:
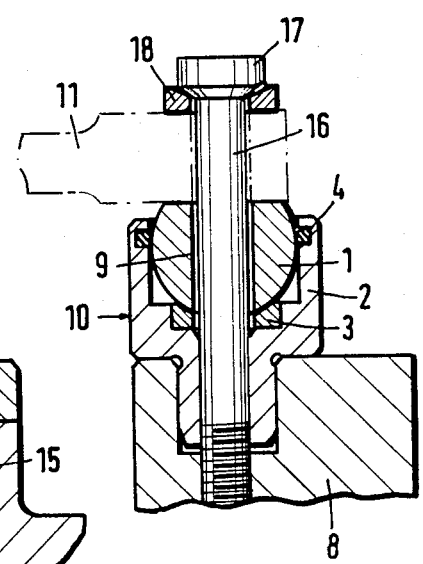
FIG. 4 shows the member of FIG. 1 in which the positioning member for defining the second and third planes also constitutes a clamping member.
Figure 5:
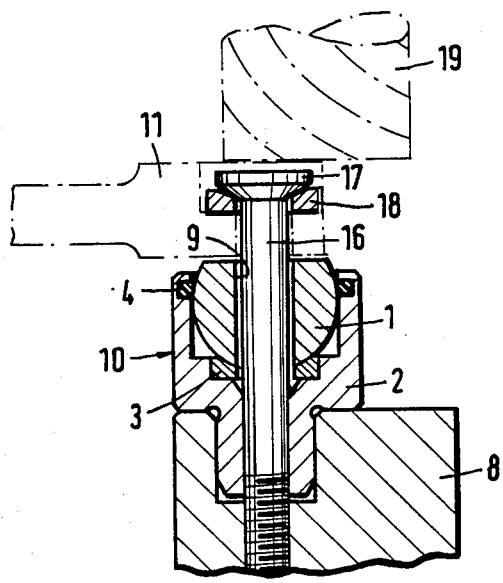
FIG. 5 shows the positioning and clamping member of FIG. 4 having a head which is received in a recess of the work piece.

FIGS. 4 and 5 show a modification of the means shown in FIGS. 2 and 3 for defining the second and third planes. In accordance with FIGS. 4 and 5, the work piece is positioned or rather, its position with regard to the second or third plane is determined by means of a screw 16 rather than by a location pin 13. The screw 16 is smaller in diameter than the bore 9 of the spherical element 1 so that the latter is capable of a limited rotation about the screw 16. The screw 16 has a sliding fit in the extension or carrier 6 of the housing 2. Female screw threads for cooperating with the screw 16 are provided in the footplate 8. Longitudinal or transverse slides may again be used to compensate for inaccuracies regarding the spacing of the locating bores in the work piece 11.

The head 17 of the screw 16 has a spherical surface portion which faces the work piece and can slidably engage a spherical seat or washer 18.

FIG. 5 shows how the head 17 of the screw is received in a recess of the work piece 11 so that said head 17 will not obstruct the movement of a machining tool 19, e.g., a milling cutter.

Figure 6:
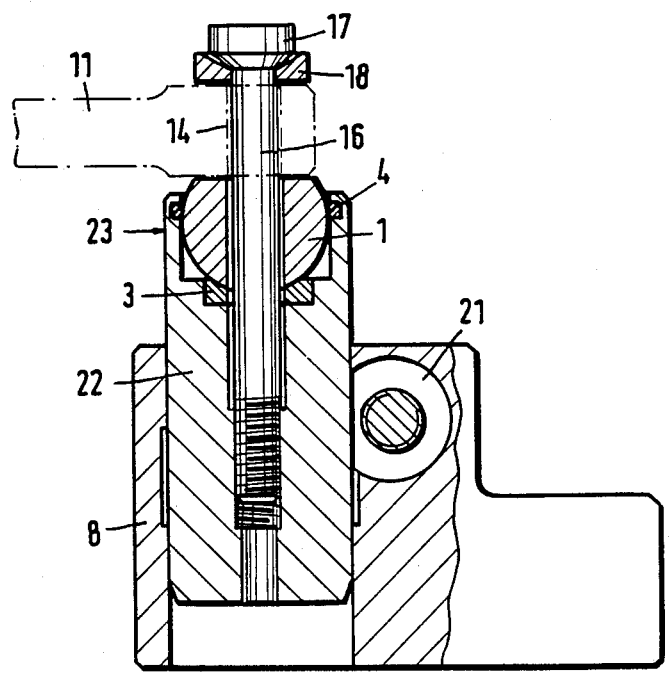
FIG. 6 shows a supporting and clamping member which is position adjustable.

FIG. 6 shows a vertically position adjustable supporting means 23 including clamping means constructed as shown in FIGS. 4 and 5. The housing 22 is vertically slidably mounted in a baseplate 8. The housing 22 and with it the flat supporting surface with which the spherical element 1 directly engages the work piece can be fixed in an adjusted elevation by means of a clamp 21. The clamping member of FIG. 6 comprises the screw 16, the head 17 of which has a spherical surface which faces the work piece 11 and slidably engages a spherical seat or washer 18, whereby the housing 22 is position adjustable.

Figure 7:
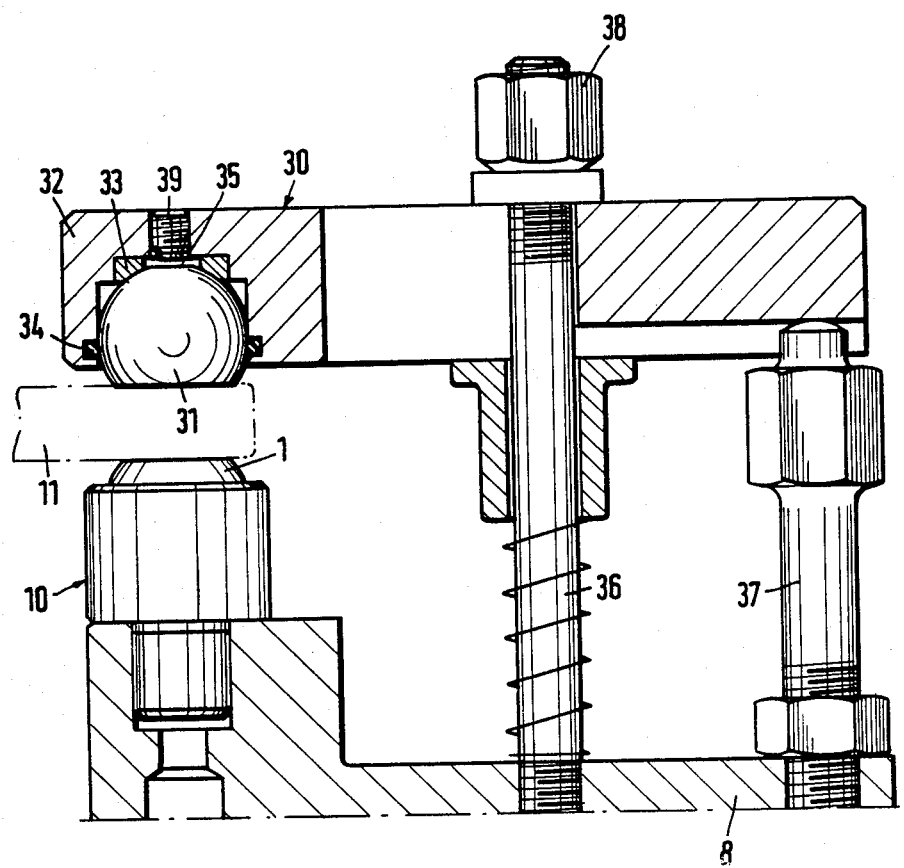
FIG. 7 shows the device according to the invention which serves to position and clamp a work piece and comprises a clamping member and a seating member each having a flattened spherical element, whereby both members are arranged in alignment or register with each other.

FIG. 7 shows a device according to the invention which comprises a positioning member 10 and a clamping member 30. The clamping member 30 comprises a flattened spherical clamping element 31, which is received in a spherical seat 33 provided in a housing 32, which is formed by a clamping bar. A seal 34 is provided between the spherical element 31 and the housing 32. A headless set screw 39 is screwed in the housing 32 and engageable with another flat surface 35 of the spherical element 31 to limit the pivoting of the spherical clamping element 31. In case of an excessive pivotal movement of the spherical clamping element 31, its non-flat surface will engage the set screw 39 so that a further rotation is prevented. Just as the spherical element 1 of the positioning member 10 has a flat work piece seating surface, the spherical clamping element 31 has a flat clamping surface which directly engages the work piece 11.

A stud 36 is screwed in the footplate 8. A backing member 37 is also screwed in the baseplate 8 and may consist of a hydraulic actuator. When the work piece 11 has been positioned, it is clamped in that the nut 38 is tightened.

Figure 8:
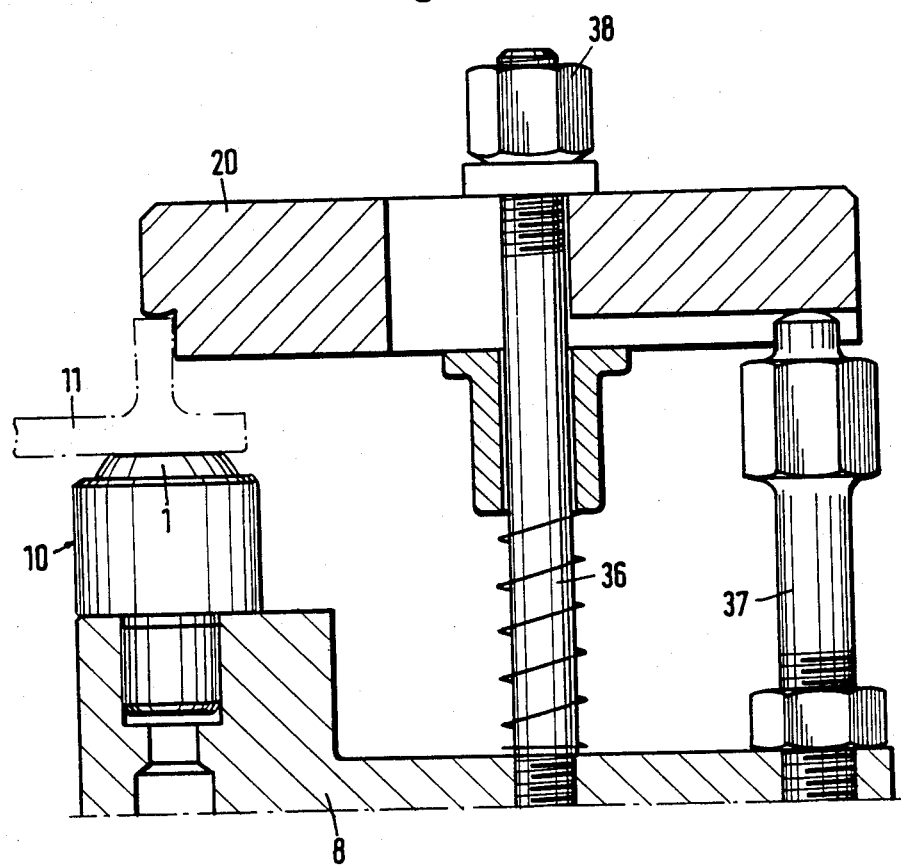
FIG. 8 shows a positioning member in conjunction with a conventional clamping member.

In the embodiment shown in FIG. 8, the work piece 11 is clamped in a conventional manner with a clamping bar 20.

FIGS. 9 to 14 show devices in which positioning members and clamping members shown in FIGS. 1, 2, 3 and 7 are assembled.

Figure 13:
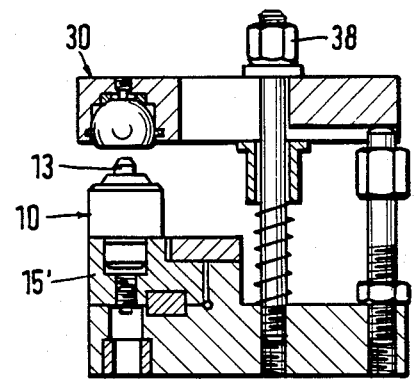
FIG. 13 shows a further modification of the device according to FIG. 11, but provided with a transverse slide.
Figure 14:
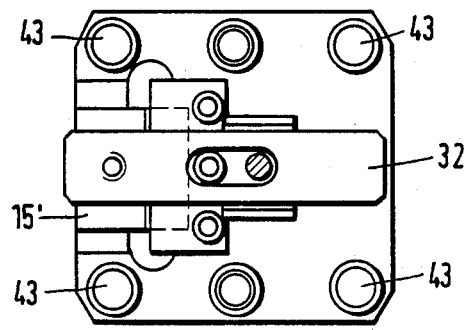
FIG. 14 is a top plan view showing the device of FIG. 13.

FIGS. 9 and 10 show device in which the members of FIGS. 1 and 7 are combined. FIG. 11 shows a device in which the members of FIGS. 3 and 7 are combined and in FIG. 12 the positioning member 10 is mounted in a longitudinal slide 15. FIGS. 13 and 14 are a front elevation and top plan view showing a combination of members as shown in FIGS. 3 and 7 and a transverse slide 15' in which the positioning member 10 is mounted.

Illustrative application of devices according to the invention provided on a common baseplate 45 and used to position and clamp different work pieces are shown in FIGS. 15 to 20.

Figure 12:
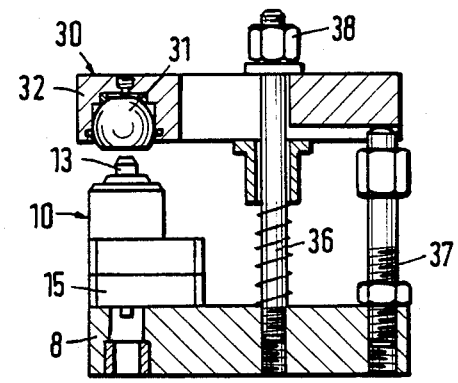
FIG. 12 shows a device according to FIG. 11 provided with a longitudinal slide.
Figure 15:
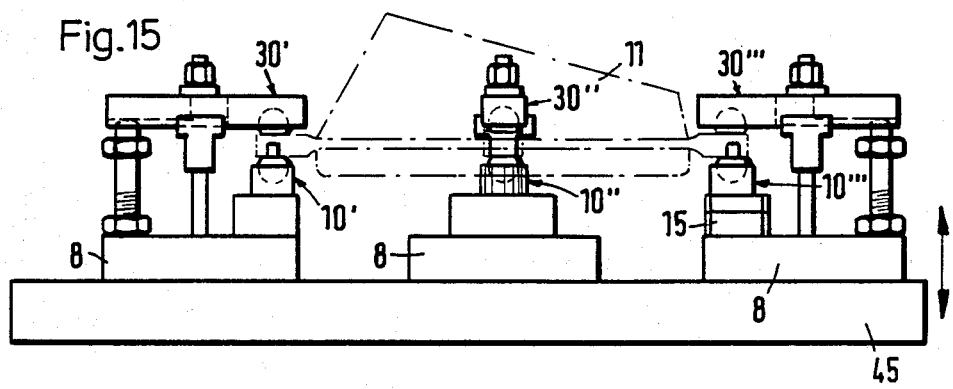
FIG. 15 shows in a side elevation how a work piece indicated in phantom lines has been positioned and clamped on a common base plate by means of devices according to FIGS. 9, 11 and 12 providing a set of three work piece seating surfaces for first positioning a work piece and three clamping surfaces for then clamping a work piece.
Figure 16:
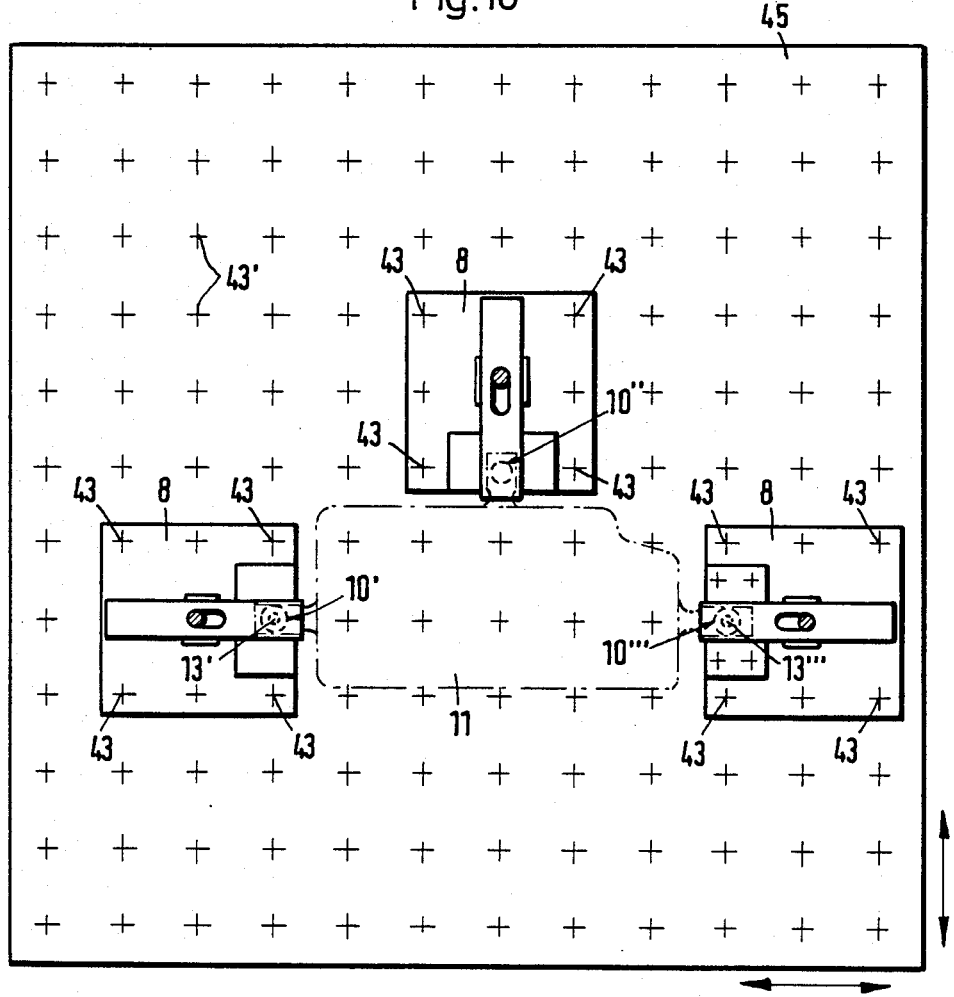
FIG. 16 is a top plan view showing the device of FIG. 15.

FIGS. 15 and 16 are a front elevation and a top plan view, respectively, showing a work piece 11 which has been positioned and clamped by means of devices as shown in FIGS. 9, 11, and 12. The double-headed arrow in FIG. 15 indicates the direction of movement with respect to the first plane. The double-headed arrows in the lower right-hand corner of FIG. 16 indicate the directions of movement with respect to the second and third planes of a three-dimensional coordinate system. The work piece 11 is positioned with respect to the first plane by three positioning members 10', 10" and 10''' providing a set of three seating surfaces. As is apparent from FIG. 16, the work piece is positioned with respect to the second and third planes by means of the locating pins 13' and 13" in the two positioning members 10" and 10'''. For a compensation of inaccuracies regarding the spacing of the locating bores of the work piece 11, the positioning member 10''' is mounted in a longitudinal slide 15. Clamping elements 30', 30" and 30'" are associated with respective positioning elements and serve to clamp the work piece 11 in the position which has been defined by the positioning elements 10', 10", and 10'".

From the top plan view of FIG. 16 it is also apparent that the footplate 8 of each device has bores 43, which are arranged in the same pattern as bores 43' in a bench or plate 45, so that it is relatively easy to secure the devices to the bench or plate 45, e.g., by means of screws.

Figure 17:
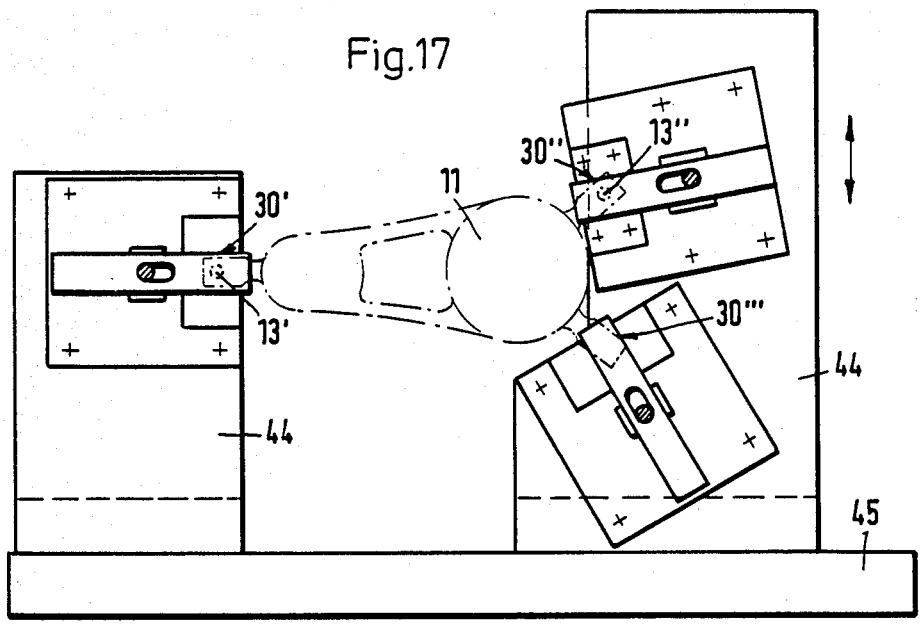
FIGS. 17 and 18 are a front elevation and a top plan view, respectively, showing by way of example an application of the devices according to the invention.
Figure 18:
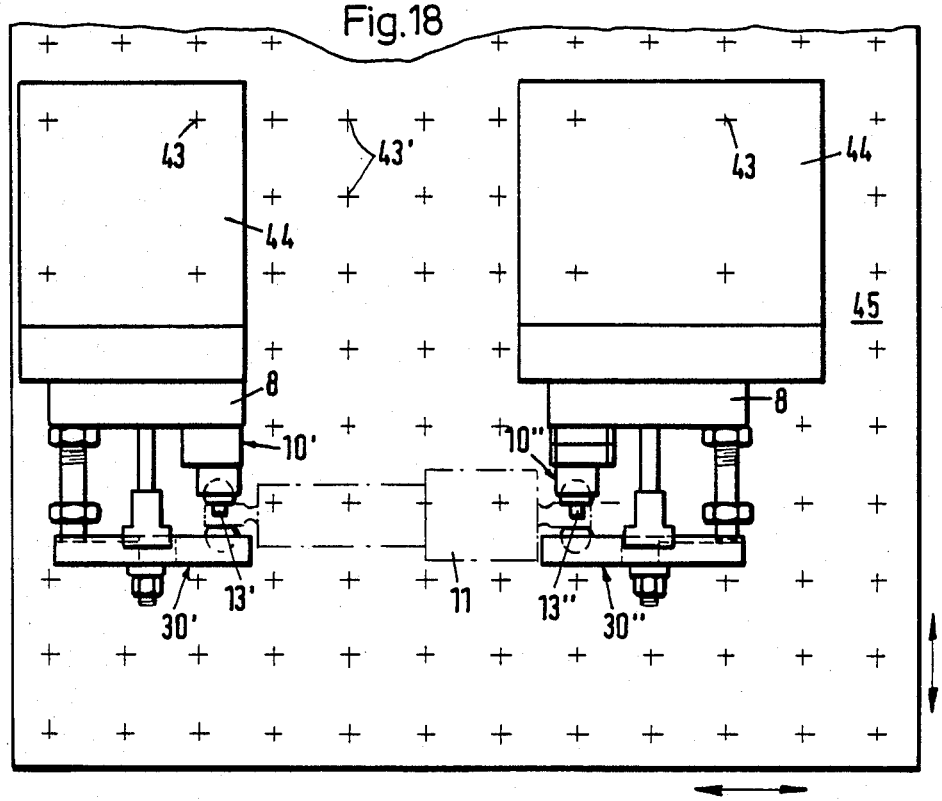

FIGS. 17 and 18 show a work piece 11 which has been positioned and clamped with the aid of interposed elements, such as angles 44. In this embodiment the positioning and clamping devices are mounted on angles when this is required for the machining of the work piece 11.

FIGS. 19 and 20 show the use of the device according to the invention for positioning and clamping a work piece 11 with respect to a first plane by means of positioning elements 10', 10" and 10'" Positioning elements 10'"', 10'"'', and 10'"''' of the kind shown in FIG. 1 are used to position the work piece with respect to the second and third planes and provide adjustable stops, which are secured to brackets 46.

Although the invention will be described with reference to specific example embodiments, it will be appreciated that it is intended to cover all modifications and equivalents within the scope of the appended claims.

What is claimed is:

1. A method for locating a work piece having a random surface by determining a geometrically precise position of said work piece having said random surface in one first plane of three planes in a three-dimensional coordinate system, to prevent a work piece position change and to prevent an elastic deformation of the work piece when the work piece is clamped subsequent to said locating, comprising the following steps:
    (a) using one set of three, and only three, work piece positioning devices for said one first plane;
    (b) providing each of said three work piece positioning devices with a ball having a first spherical surface and a cut-off segment forming a flat plane surface for seating a work piece only on three flat plane seating surfaces;
    (c) further providing each of said three positioning devices with a ball holder, each ball holder including a socket recess with a second spherical surface defining at its center a fixed universal pivot point for the respective ball received in the socket recess for a universal pivoting movement between said first and second spherical surfaces and independently of any universal pivoting movement of the other two balls;
    (d) rigidly securing said three ball holders to a base so that said three universal pivot points form the tips of a triangle defining said one first plane;
    (e) limiting the pivotal movement of each ball; and
    (f) seating said work piece with its random surface on said three flat plane seating surfaces.

2. The method of claim 1, further comprising seating a work piece on said three flat plane surfaces so that said work piece reaches beyond all three fixed pivot points outside said triangle.

3. The method of claim 1, further comprising determining the position of said work piece also in a second plane extending perpendicularly to said first plane in said three-dimensional coordinate system by contacting said work piece with a stop outside said first plane.

4. The method of claim 3, further comprising providing said stop in the form of a further flat, plane surface of a further ball pivoting in a further ball holder, and locating said further flat, plane surface outside said first plane.

5. The method of claim 3, further comprising providing said stop in the form of a locating pin or screw fitting into a hole of said work piece and extending perpendicularly to one of said three flat, plane seating surfaces.

6. The method of claim 1, further comprising supporting said work piece while simultaneously maintaining the determined, located position of the work piece.

7. The method of claim 1, further comprising clamping said work piece while simultaneously maintaining the determined, located position of the work piece.

* * * * *